(12) United States Patent
Ferrarese et al.

(10) Patent No.: US 11,186,140 B2
(45) Date of Patent: Nov. 30, 2021

(54) AIR INTAKE DEVICE FOR AN AIR CONDITIONING UNIT OF A VEHICLE

(71) Applicant: DENSO THERMAL SYSTEMS S.p.A., Turin (IT)

(72) Inventors: Claudio Ferrarese, Turin (IT); Andrea Carbone, Turin (IT)

(73) Assignee: Denso Thermal Systems S.P.A., Turin (IT)

( * ) Notice: Subject to any disclaimer, the term of this patent is extended or adjusted under 35 U.S.C. 154(b) by 199 days.

(21) Appl. No.: 16/595,222

(22) Filed: Oct. 7, 2019

(65) Prior Publication Data

US 2020/0108695 A1 Apr. 9, 2020

(30) Foreign Application Priority Data

Oct. 8, 2018 (IT) .................. 102018000009234

(51) Int. Cl.
*B60H 1/24* (2006.01)
*B60H 1/00* (2006.01)
*B60H 1/26* (2006.01)

(52) U.S. Cl.
CPC ..... *B60H 1/00864* (2013.01); *B60H 1/00485* (2013.01); *B60H 1/248* (2013.01); *B60H 1/26* (2013.01)

(58) Field of Classification Search
CPC .. B60H 1/00485; B60H 1/24; B60H 1/00664; B60H 1/00671; B60H 1/00835; B60H 1/00842; B60H 1/00864; B60H 1/00849

(Continued)

(56) References Cited

U.S. PATENT DOCUMENTS 5,645,479 A * 7/1997 Komowski ........ B60H 1/00514
454/139
2007/0128999 A1* 6/2007 Komowski ......... F16K 11/0525
454/155

(Continued)

FOREIGN PATENT DOCUMENTS

DE 19832337 A1 1/2000
DE 102014102146 A1 8/2015

(Continued)

OTHER PUBLICATIONS

Italian Search Report for IT Application No. 10201800009234, dated Jun. 17, 2019, 7 pages. No English Translation available.

*Primary Examiner* — Vivek K Shirsat
*Assistant Examiner* — Ko-Wei Lin
(74) *Attorney, Agent, or Firm* — Armstrong Teasdale LLP

(57) ABSTRACT

Described herein is an air intake device for an air conditioning unit of a vehicle, the air intake device including a casing on which there are formed a fresh air inlet, a recirculation air inlet, and an air outlet adapted to be associated to an air inlet of a blower of the air conditioning unit, and a pair of drum flaps mounted to the casing and rotatable about a common rotation axis and movable between a fresh air extreme position and a recirculation extreme position. In the fresh air extreme position, the angular span of the recirculation air inlet is partially covered by one of the drum flaps and partially covered by the other of the drum flaps, and in the recirculation extreme position, the angular span of the fresh air inlet is completely covered by one of the drum flaps, the drum flaps overlapping each other.

11 Claims, 5 Drawing Sheets

(58) Field of Classification Search
USPC .................................................. 454/69–165
See application file for complete search history.

(56) References Cited

U.S. PATENT DOCUMENTS

2014/0194048 A1* 7/2014 Wittmann ................. B60H 1/24
                                                              454/139
2017/0282682 A1* 10/2017 Lee .......................... B60H 1/26
2019/0054799 A1* 2/2019 Wijaya ................ B60H 1/00021

FOREIGN PATENT DOCUMENTS

| EP | 0656272 A1  | 6/1995 |
| FR | 2878469 A1  | 6/2006 |
| FR | 2920044 A1  | 2/2009 |
| JP | H09226348 A | 9/1997 |

* cited by examiner

AIR INTAKE DEVICE FOR AN AIR CONDITIONING UNIT OF A VEHICLE

CROSS-REFERENCE TO RELATED APPLICATIONS

This application claims the benefit of priority to Italian Patent Application No. 102018000009234, filed Oct. 8, 2018, the entire contents of which are hereby incorporated by reference herein.

FIELD OF THE INVENTION

The present invention relates to an air intake device for an air conditioning unit of a vehicle.

BACKGROUND

Devices of this type are coupled to the air inlet of the air conditioning unit fan, and are connected to the external air intakes of the vehicle and to the air recirculation pipe in the passenger compartment of the vehicle to selectively allow the entry of fresh air or recirculation air to the fan.

Since in a vehicle the fresh air inlet must face forward to allow an easy transfer of the outside air from the external sockets towards the air conditioning unit, the recirculation air inlet is generally turned backwards towards the passenger compartment, and therefore can be an important means of spreading the noise generated by the fan and by the operation of the air conditioning unit.

An object of the present invention is to propose solutions for increasing the efficiency of the air-conditioning unit and reducing the noise perceived inside the passenger compartment of the vehicle and generated by the operation of this unit.

BRIEF DESCRIPTION

This object is achieved according to the invention by an air intake device for an air conditioning unit of a vehicle, comprising
- a casing on which there are formed a fresh air inlet, a recirculation air inlet and an air outlet adapted to be associated to an air inlet of a blower of an air conditioning unit, and
- a pair of drum flaps mounted to the casing in a manner rotatable about a common rotation axis, and movable between a fresh air extreme position, in which the drum flaps maximize fluid communication between the fresh air inlet and the air outlet and prevent fluid communication between the recirculation air inlet and the air outlet, and a recirculation extreme position, in which the drum flaps maximize fluid communication between the recirculation air inlet and the air outlet and prevent fluid communication between the fresh air inlet and the air outlet, wherein between the drum flaps there are interposed elastic means by means of which one of the drum flaps is capable of driving the other of the drum flaps during rotation motion of the drum flaps between the fresh air extreme position and the recirculation extreme position, the air intake device being characterized in that in the fresh air extreme position the angular span of the recirculation air inlet is partially covered by one of the drum flaps and partially covered by the other of the drum flaps, and in the recirculation extreme position the angular span of the fresh air inlet is completely covered by one of the drum flaps, the drum flaps being overlapping each other.

Since the recirculation air inlet is combined in a combined manner from both drum flaps, the angular span of the recirculation air inlet can be increased. This means that with the same air flow rate the speed of the incoming air flow can be reduced. Furthermore, it is possible to modulate the transition from the extreme fresh air position to the extreme recirculation position.

All this allows on the one hand to increase the performance of the air conditioning unit, and on the other hand to reduce the noise perceived inside the passenger compartment.

Preferably, at the recirculation air inlet there is arranged a noise damping grille mounted to the casing. This noise damping grille has a plurality of openings, each opening having walls parallel to each other and parallel to the walls of the other openings. This expedient allows to further reduce the noise, thanks to the reflection and the reciprocal interference of the sound waves achieved due to the walls of the openings of the damping grille.

As a further expedient it is possible to adopt a deflector cap mounted on the box at the recirculation air inlet, so that this deflector cap defines a conduit having an inlet port oriented towards the fresh air opening and an outlet port coinciding with the recirculation air inlet. In this way, the sound waves are no longer oriented towards the passenger compartment of the vehicle, but forward, allowing to obtain a positive effect in terms of noise reduction.

BRIEF DESCRIPTION OF THE FIGURES

Further features and advantages of the device according to the invention will become apparent from the following detailed description of an embodiment of the invention, made with reference to the accompanying drawings, provided for illustrative and non-limiting purposes only, in which.

DETAILED DESCRIPTION

Figure 1:
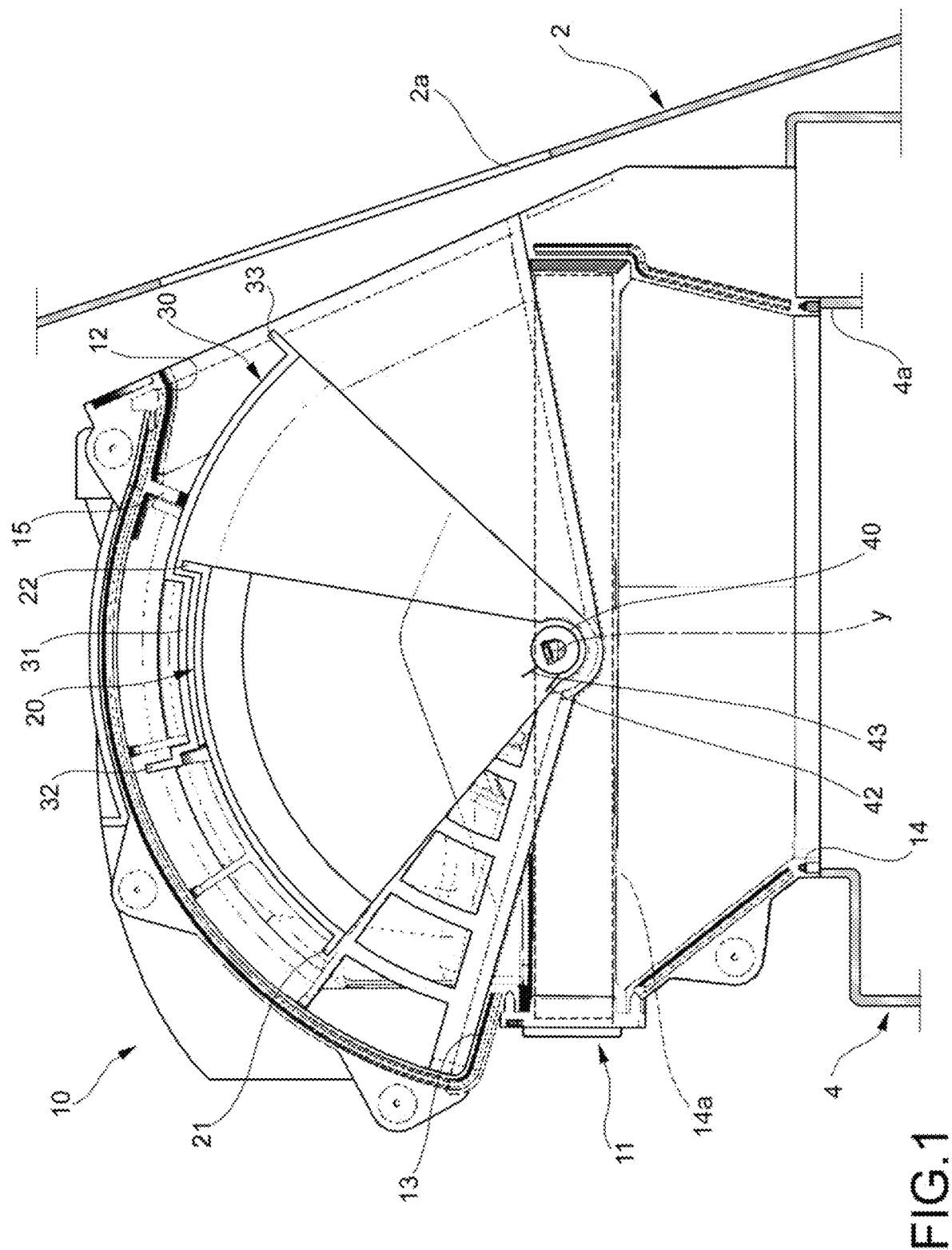
FIGS. 1 to 3 are sectional views of an air intake device according to the invention, respectively in a partial recirculation position, in an extreme fresh air position, and in an extreme recirculation position.
Figure 2:
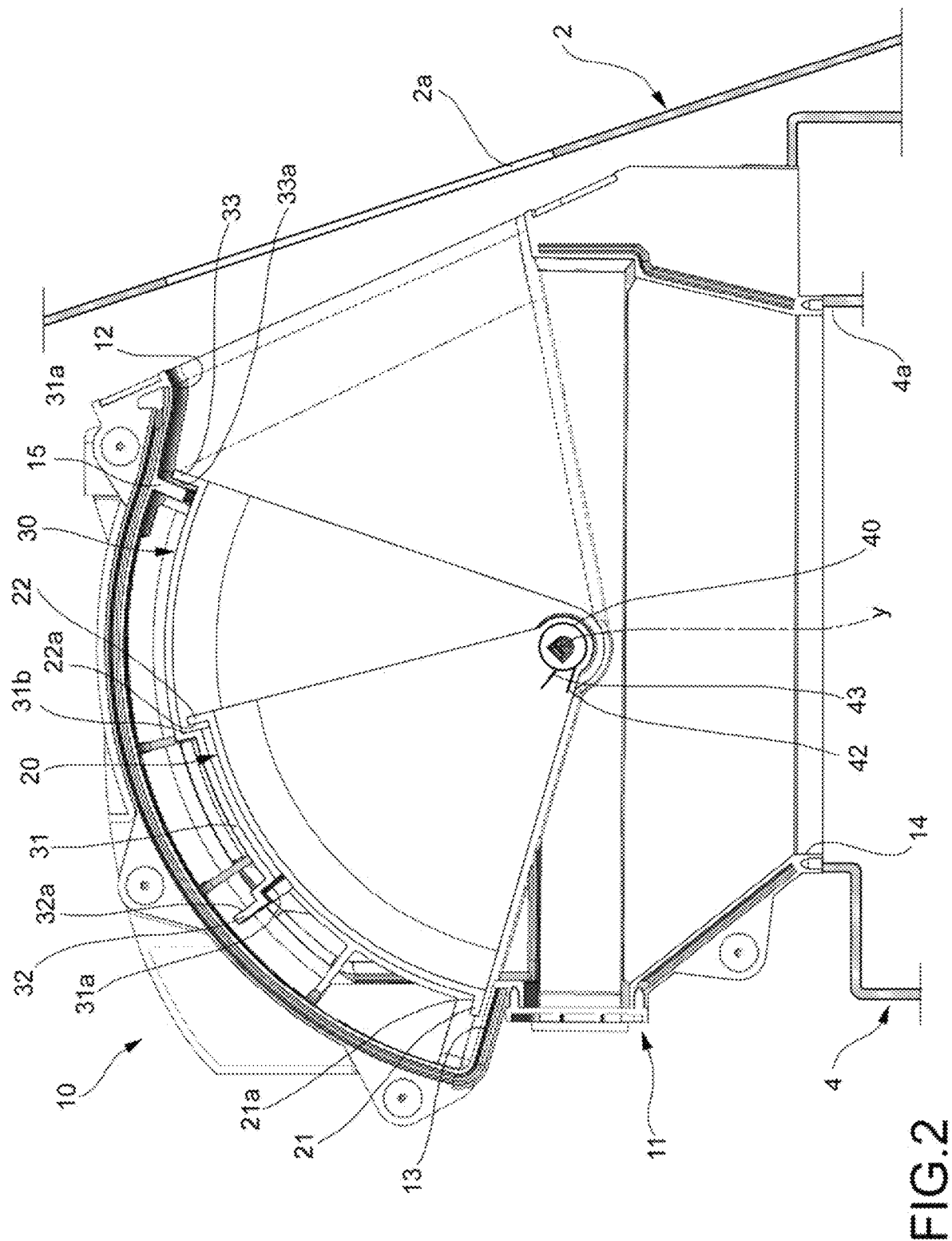
Figure 3:
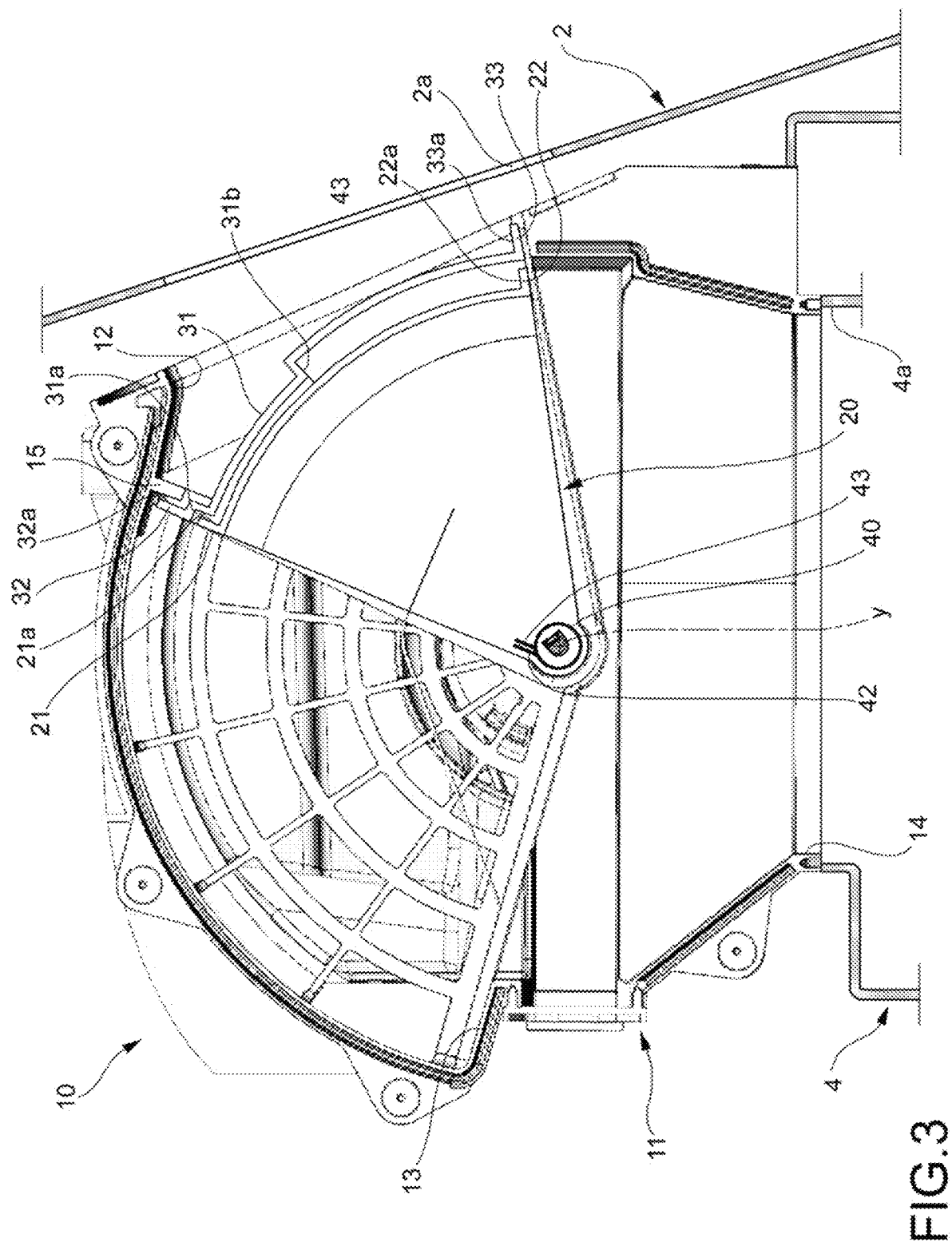

In the figures an air intake device is indicated as a whole with reference numeral 10. In FIGS. 1-3, the device 10 is shown installed on a vehicle. In particular, FIGS. 1-3 show a firewall 2, which separates the engine compartment of the vehicle (in the figures, to the left of the wall 2) from the passenger compartment of the vehicle (to the right in the figures). In the firewall 2, an aperture 2a is obtained, through which fresh air coming from external air intakes (not shown) arranged at the engine compartment can reach the air intake device 10.

The air intake device is coupled to an air conditioning unit 4 of the vehicle, a part of the wall whereof is shown in FIGS. 1-3. FIGS. 1-3 also show an air inlet 4a of the air-conditioning unit, downstream of which an electric fan (not shown) is arranged for air circulation.

The air intake device 10 comprises a casing 11 which encloses a chamber, which is in communication with the outside of the casing 11 through a fresh air inlet 12, a recirculation air inlet 13 and an air outlet 14. The fresh air inlet 12 is in fluid communication with the external air intakes, through the aperture 2a formed in the firewall 2. The recirculation air inlet 13 is in fluid communication with a pipe (not shown) for the air recirculation inside the vehicle passenger compartment. The air outlet 14 is coupled to the air inlet 4a of the air conditioning unit 4.

Inside the casing 11 and at the air outlet 14 an air filter 14a is arranged, drawn with a dashed line in FIG. 1 and for clarity omitted in the subsequent figures.

The air intake device 10 comprises a pair of drum flaps, indicated with reference numerals 20 and 30 in the figures. The drum flaps 20, 30 are mounted to the casing 11 rotatably around a same axis of rotation y orthogonal to the plane of the drawing in FIGS. 1-3. Of these coaxial flaps, the one indicated with 20 will be designated hereinafter as the driving flap and is arranged radially more inward, while that indicated with 30 will be designated as a driven flap and is arranged radially more outward. Of course other arrangements of the two flaps are possible. In a completely conventional manner, each of the flaps 20, 30 consists of a monolithic body of plastic material, comprising a pair of lateral arms through which the flap is hingedly connected to the casing 11, and an intermediate connection portion which interconnects the side arms.

The driving flap 20 is coupled to an actuator and/or to a movement mechanism (not shown) configured to adjust the angular position of the driving flap 20. The driving flap 20 is operatively connected to the driven flap 30 by elastic means 40. In particular, these elastic means may consist of a torsion spring having an end 42 coupled to the driving flap 20 and an end 43 coupled to the driven flap 30, and represented in a simplified manner in FIGS. 1-3. Through the torsion spring 40, the driving flap 20 is able to drive the driven flap 30 into rotation.

The drum flaps 20, 30 can be moved between an extreme fresh air position (shown in FIG. 2), in which the drum flaps 20, 30 maximize the fluid communication between the fresh air inlet 12 and the air outlet 14 and prevent fluid communication between the recirculation air inlet 13 and the air outlet 14, and an extreme recirculation position (shown in FIG. 3), in which the drum flaps 20, 30 maximize the fluid communication between the recirculation air inlet 13 and air outlet 14 and prevent fluid communication between the fresh air inlet 12 and the air outlet 14.

In the illustrated example, the drum flaps 20, 30 have substantially the same angular span. Herein and hereinafter, by angular span of an element means the angular extension of the element under consideration, measured with respect to the axis of rotation y which defines the vertex of the angle. More generally, whenever an angle or angular direction is referred to, this angular angle or direction will refer to a vertex coincident with the rotation axis y. Similarly, a radial direction will be a direction orthogonal to the rotation axis y.

On the flaps there are also provided striking means which comprise, on the driving flap 20, a pair of projections 21, 22 formed at angularly opposite ends of the driving flap 20 and extending radially from the driving flap 20 towards the driven flap 30. On the projections 21 and 22 there are respectively a first and a second abutment surface, respectively 21a and 22a. On the driven flap 30, the abutment means comprise a projection 31 extending radially from the driven flap 30 towards the driving flap 20. At the angularly opposite ends of the projection 31 there are arranged a third and a fourth abutment surface, respectively 31a and 31b. The angular distance between the third abutment surface 31a and the fourth abutment surface 31b is less than the angular distance between the first abutment surface 21a and the second abutment surface 22a.

The driven flap 30 also has a pair of projections 32, 33 extending radially outwards from the driven flap 30 and arranged at angularly opposite ends of the driven flap 30. On the projections 32 and 33 there are respectively a fifth and a sixth abutment surface, respectively 32a and 33a. As will be explained below, the fifth and sixth abutment surfaces 32a and 33a are adapted to engage a stop 15 formed on the casing 11 and arranged between the fresh air inlet 12 and the recirculation air inlet 13.

In the extreme fresh air position shown in FIG. 2, the angular span of the recirculated air inlet 13 is partly covered by the driving flap 20 and partly covered by the driven flap 30. The flaps 20, 30 are partially overlapping one another.

In this position, one of the projections, 21, of the driving flap 20 is in abutment against an edge of the recirculation air inlet 13 away from the stop 15. The second abutment surface 22a of the driving flap 20 abuts against the fourth abutment surface 31b of the driven flap 30, while the sixth abutment surface 33a of the driven flap 30 abuts against the stop 15.

By actuating the driving flap 20, this rotates about the axis of rotation y, in the clockwise direction in the figures, and the driven flap 30, being connected to the driving flap 20 by means of the spring 40, moves together with the driving flap 20. In this way, the recirculation air inlet 13 opens progressively, while the fresh air inlet closes progressively. In this step, it is therefore possible to modulate the proportion between fresh air and recirculation air. One of the intermediate positions associated with the movement from the extreme fresh air position to the extreme re-circulation position is shown in FIG. 1.

When the first abutment surface 21a of the driving flap 20 comes into abutment against the third abutment surface 31a of the driven flap 30, the driving flap 20 begins to drag the driven flap 30 with it. In this way, the recirculation air inlet 13 continues to open progressively towards the extreme recirculation position, while the fresh air inlet 12 begins to close progressively towards the extreme recirculation position.

When one of the projections, 33, of the driven flap 30 abuts against an edge of the fresh air inlet 12 away from the stop 15 and the fifth abutment surface 32a of the driven flap 30 abuts against the stop 15, the driven flap 30 stops while the driving flap 20 can continue the rotation movement against the action of the spring 40 which is compressed. The rotating movement of the driven flap stops when the first abutment surface 21a of the driving flap 20 comes into contact with the third abutment surface 31a of the driven flap 30 and the projections 22 of the driving flap 20 abuts against the edge of the fresh air inlet 12 away from the stop 15. The extreme recirculation position shown in FIG. 3 is then reached. In this extreme position, the angular span of the fresh air inlet 12 is completely covered by the driven flap 30, and the drum flaps 20, 30 are completely superimposed on each other.

In the opposite movement from the position of FIG. 3 to the position of FIG. 2, initially only the driving flap 20 rotates while the driven flap 30 is kept still due to the elastic force exerted by the spring 40. The movement of the single driving flap 30 continues until the second abutment surface 22a of the driving flap 20 abuts against the fourth abutment surface 31b of the driven flap 30. Then the two flaps 20, 30 rotate integrally, passing through the intermediate position of FIG. 1 and finally reaching the extreme fresh air position of FIG. 2.

Figure 4:
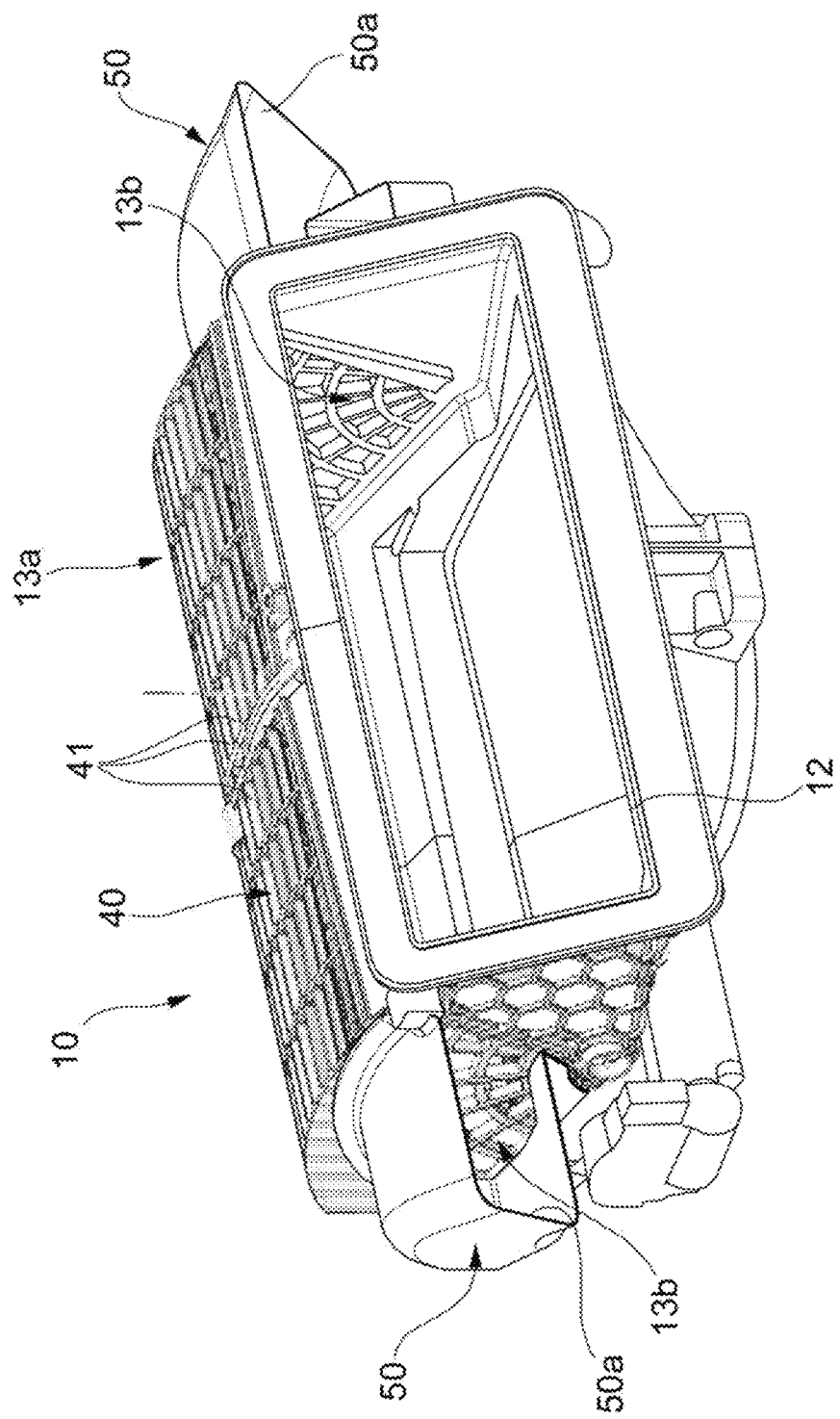
FIGS. 4 and 5 are a perspective views of the device in FIG. 1.
Figure 5:
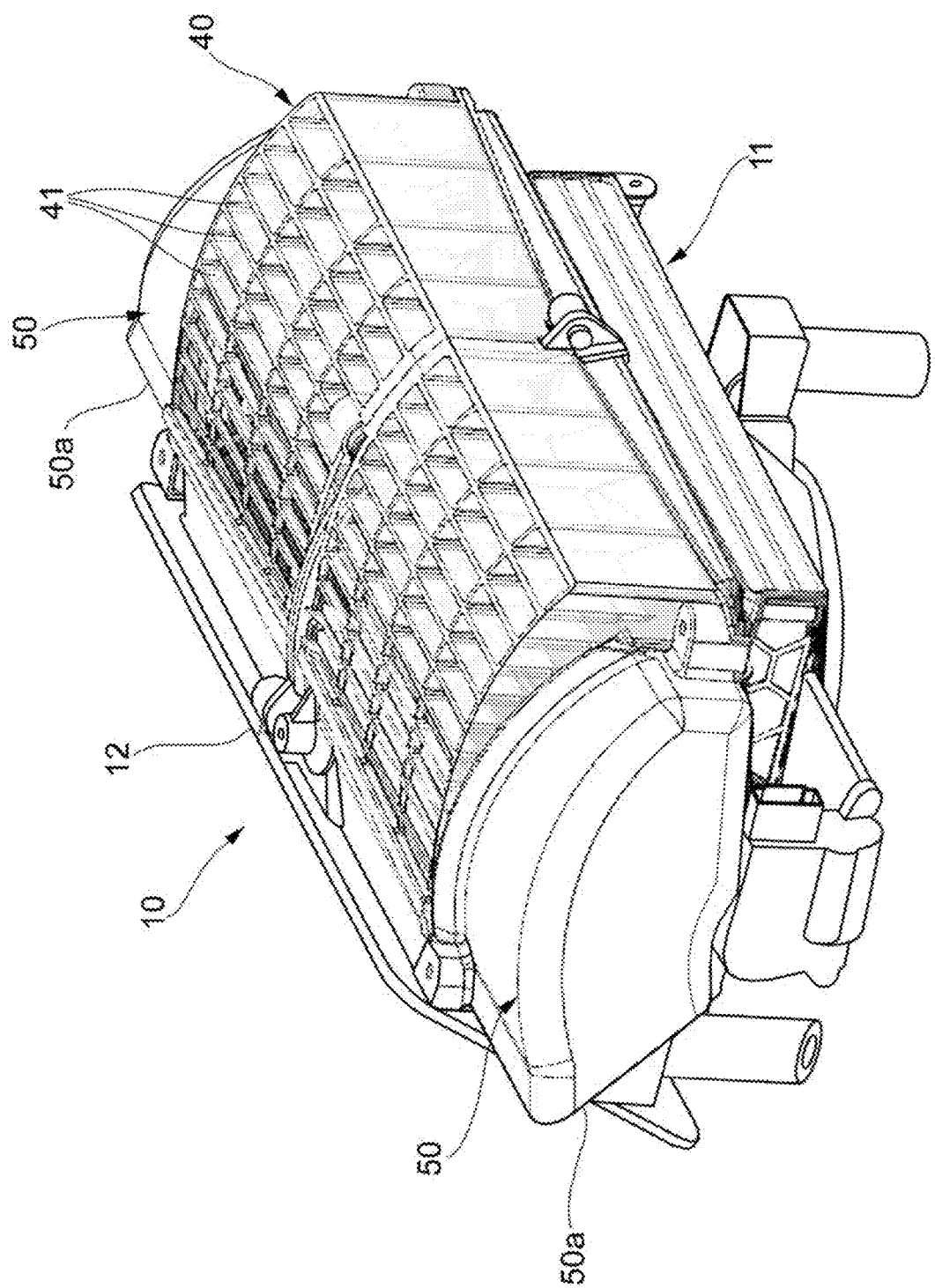

With reference to FIGS. 4 and 5, further features of the air intake device 10 are now described, which may be present in combination with the flaps described above but also with other flap configurations.

At the recirculation air inlet 13 there is arranged a noise damping grille 40 mounted to the casing 11. This noise damping grille 40 has a plurality of apertures 41. Each aperture 41 is delimited by wall surfaces parallel to each other, so that each aperture has a substantially prismatic shape. Furthermore, the wall surfaces of each aperture 41 are parallel to the wall surfaces of the other apertures 41.

As shown in FIG. 4, the recirculation air inlet 13 may comprise a main air inlet 13a oriented in radial direction and at least one secondary air inlet 13b oriented in a direction orthogonal to the radial direction. In the illustrated example, there are two secondary air inlets 13b formed on opposite side walls of the casing 11 and provided with respective noise damping grilles configured similar to the noise damping grille 40.

At least one deflecting cap is mounted to the casing at at least one of said main air inlet 13a and secondary air inlets 13b. In the illustrated example there are two deflecting caps 50 applied at the two secondary air inlets 13b. According to an alternative embodiment, a single deflecting cap may be provided which covers the main air inlet 13a and secondary air inlets 13b. The deflecting cap 50 defines a duct having an inlet port 50a oriented towards the fresh air opening 12 (i.e. towards the engine compartment) and an outlet port coinciding with the respective recirculation air inlet, 13a and/or 13b, of the device 10.

The invention claimed is:

1. An air intake device for an air conditioning unit of a vehicle, the air intake device comprising:
   a casing on which there are formed a fresh air inlet, at least one recirculation air inlet, and an air outlet adapted to be associated to an air inlet of a blower of the air conditioning unit, and
   a pair of drum flaps mounted to the casing in a manner rotatable about a common rotation axis, and movable between a fresh air extreme position, in which the drum flaps maximize fluid communication between the fresh air inlet and the air outlet and prevent fluid communication between the at least one recirculation air inlet and the air outlet, and a recirculation extreme position, in which the drum flaps maximize fluid communication between the at least one recirculation air inlet and the air outlet and prevent fluid communication between the fresh air inlet and the air outlet, wherein between the drum flaps there is interposed an elastic member by means of which one of the drum flaps is capable of driving the other of the drum flaps during rotation motion of the drum flaps between the fresh air extreme position and the recirculation extreme position,
   wherein in the fresh air extreme position, an angular span of the at least one recirculation air inlet is partially covered by one of the drum flaps and partially covered by the other of the drum flaps, and in the recirculation extreme position, an angular span of the fresh air inlet is completely covered by one of the drum flaps, and the drum flaps overlap each other.

2. The device of claim 1, wherein one of the drum flaps is a driving flap, the driving flap comprising a first abutment surface and a second abutment surface arranged on angularly opposing ends of the driving flap,
   wherein the other of the drum flaps is a driven flap, the driven flap comprising a third abutment surface and a fourth abutment surface arranged on respective distinct angular positions of the driven flap, and
   wherein an angular distance between the third and the fourth abutment surfaces is less than an angular distance between the first and second abutment surfaces.

3. The device of claim 2, wherein the abutment surfaces on each of the drum flaps radially protrudes towards the other of the drum flaps.

4. The device of claim 2, wherein the driving flap is arranged radially inwards of the driven flap.

5. The device of claim 4, wherein the driven flap further comprises fifth and sixth abutment surfaces arranged on angularly opposing ends of the driven flap, wherein a stop is formed on the casing and arranged between the fresh air inlet and the at least one recirculation air inlet, said stop being engageable by the fifth abutment surface and by the sixth abutment surface in the recirculation extreme position and in the fresh air extreme position, respectively.

6. The device of claim 1, wherein the drum flaps have substantially the same angular span.

7. The device of claim 1, wherein the elastic member comprises a torsion spring.

8. The device of claim 1, wherein a noise damping grille is mounted to the casing and arranged at the at least one recirculation air inlet.

9. The device of claim 8, wherein the noise damping grille has a plurality of apertures, each aperture being bounded by wall surfaces parallel to each other and parallel to the wall surfaces of the other apertures.

10. The device of claim 1, wherein the at least one recirculation air inlet comprises a main air inlet oriented in a radial direction and at least one secondary air inlet oriented in a direction orthogonal to the radial direction.

11. The device of claim 10, comprising at least one deflecting cap mounted to the casing at at least one of the main air inlet and the at least one secondary air inlet, the deflecting cap defining a duct having an inlet port oriented towards the fresh air inlet and an outlet port coinciding with at least one of the main air inlet and the at least one secondary air inlet.

* * * * *